March 2, 1965
E A DOMES
3,171,670
VEHICLE SUSPENSION MEANS
Filed Sept. 17, 1962
3 Sheets-Sheet 2
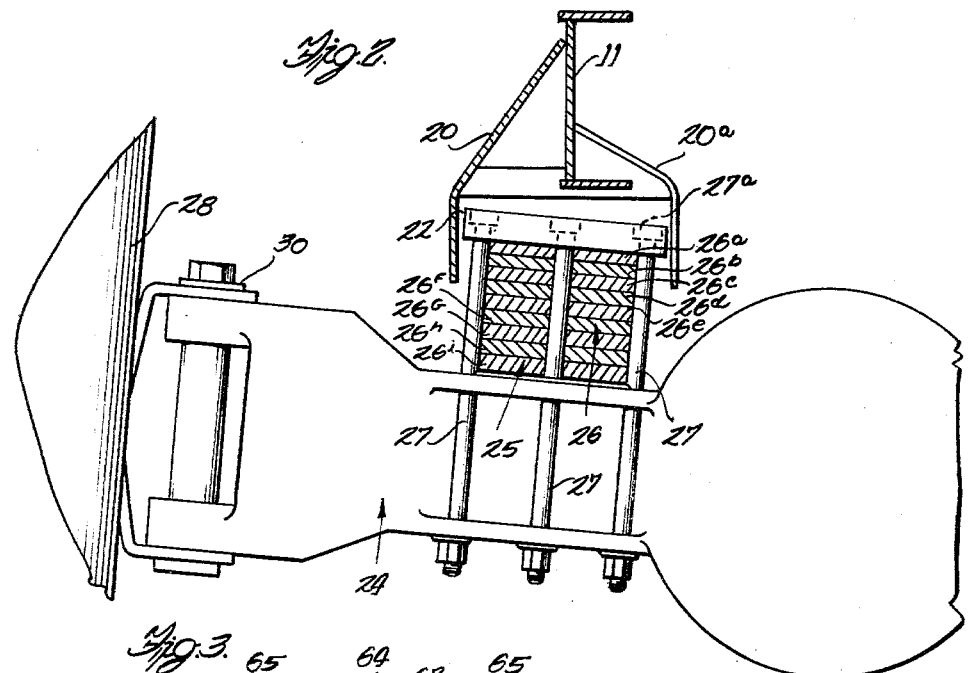
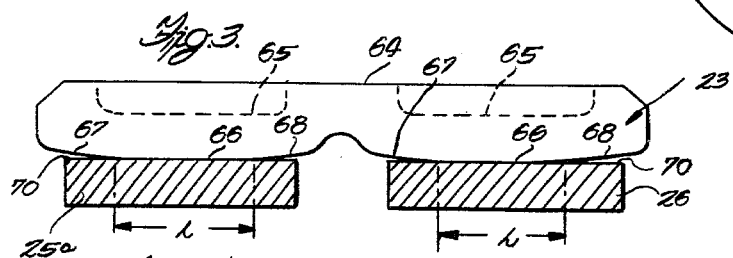
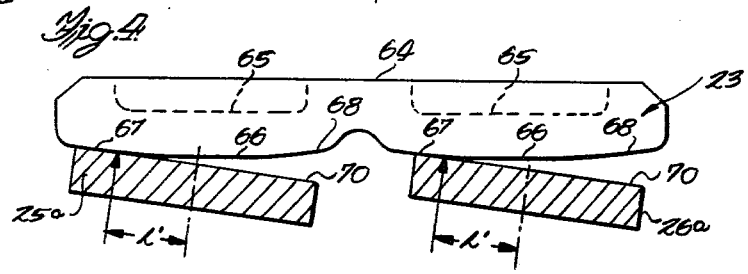
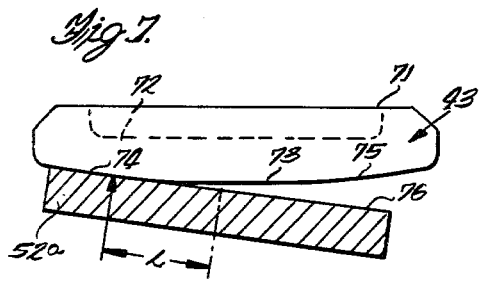
Inventor
E. A. Domes
Attorney March 2, 1965  E A DOMES  3,171,670
VEHICLE SUSPENSION MEANS
Filed Sept. 17, 1962  3 Sheets-Sheet 3
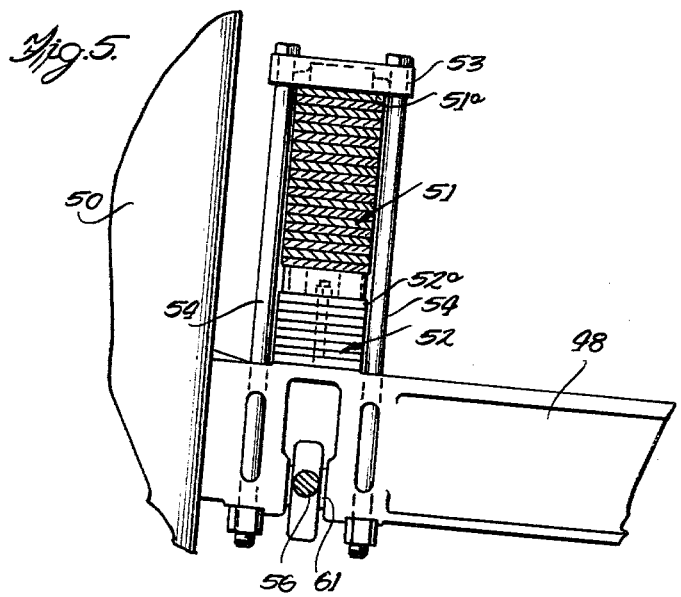
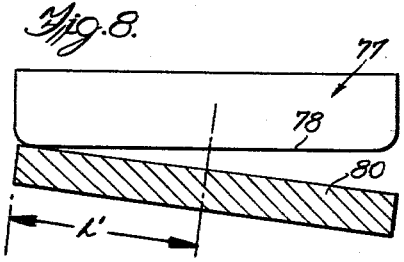
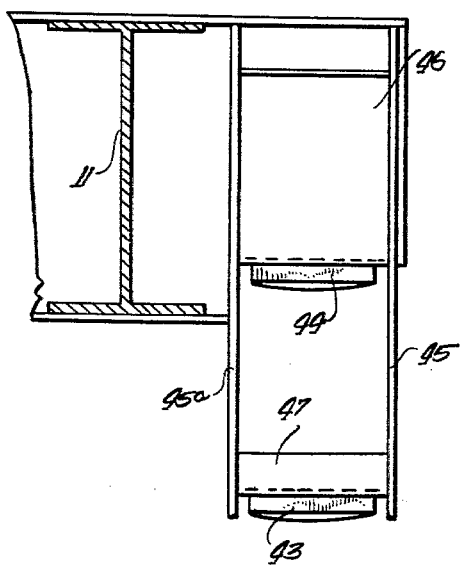
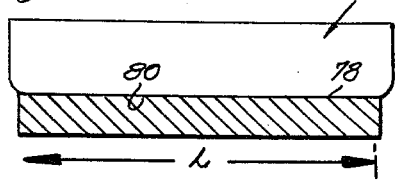
Inventor
E. A. Domes
Attorney

# United States Patent Office 3,171,670
Patented Mar. 2, 1965

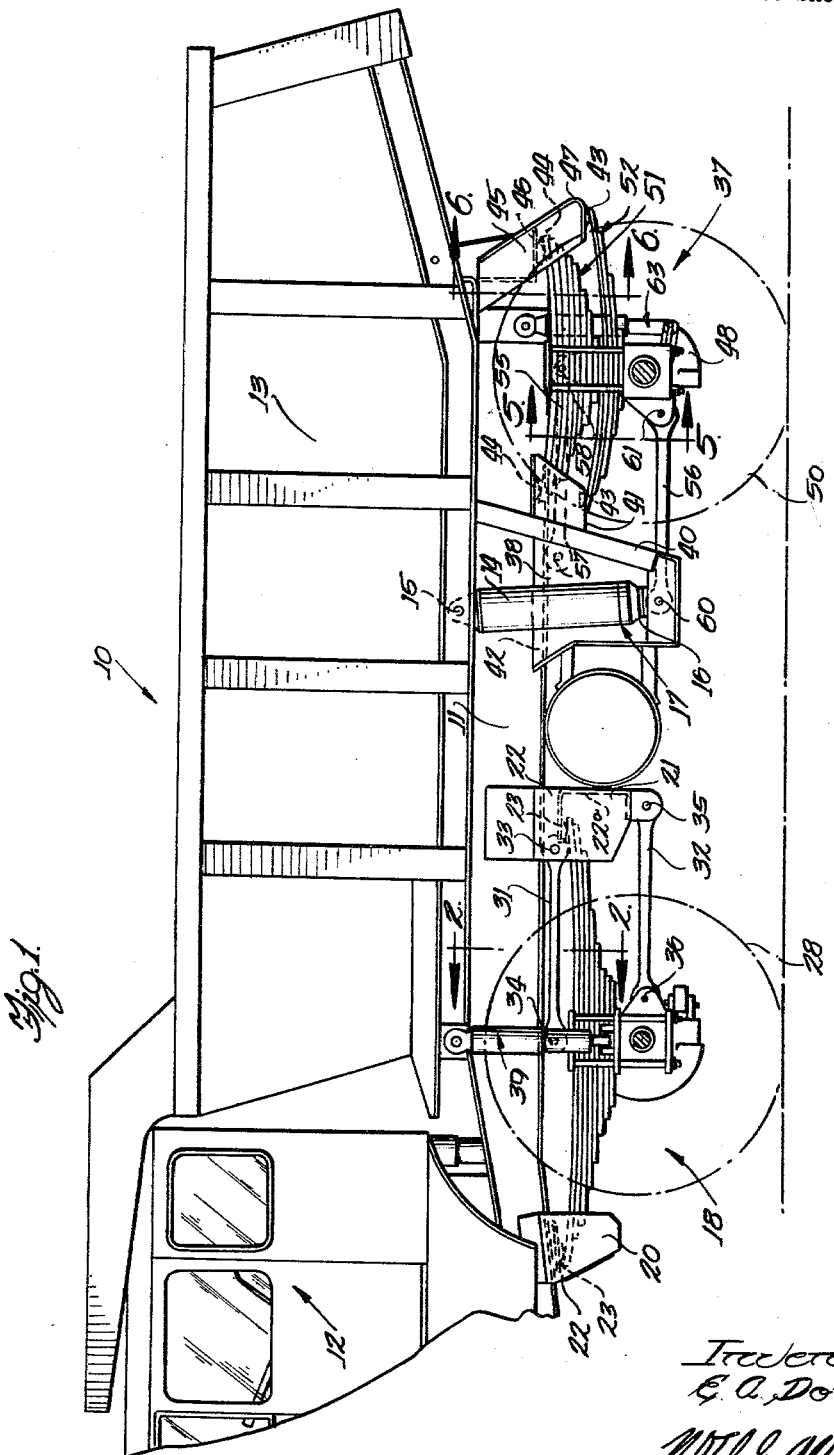

3,171,670
VEHICLE SUSPENSION MEANS
E A Domes, Wheaton, Ill., assignor to International Harvester Company, Chicago, Ill., a corporation of New Jersey
Filed Sept. 17, 1962, Ser. No. 224,257
5 Claims. (Cl. 280—124)

This invention relates to a vehicle suspension means and more particularly to a suspension means providing support means including novel support pads in engagement and connection with a leaf spring suspension associated with a wheel axle assembly.

An object of this invention is to provide the use of novel support pads engaging the outermost ends of a leaf spring suspended wheel axle assembly to substantially reduce the effective moment force about the longitudinal axis of the vehicle during loadings on the wheel axle assembly.

Another object of this invention is to provide novel support pads having a transverse portion shaped to engage the outermost ends of the leaf spring suspended wheel axle assembly to substantially reduce the effective loading force on the leaf spring during loadings on the wheel axle assembly about the longitudinal axis thereof. Further, the transverse portion of the support pads are shaped so that only a portion thereof is engaged by a corresponding engaging portion on the outermost end of the leaf springs when the loadings on the wheel axle assembly occur only about the transverse axis of the vehicle.

Further, another object of this invention is to provide the use of a novel support means with support pads attached to the chassis frame member of a vehicle and engaging the outermost ends of one of the leaves of a leaf spring assembly. The support pads include a transverse shaped portion having arcuate surfaces interconnected by a lateral flat extending surface. The leaf spring assembly is attached to a wheel axle assembly such that a locating means connected to the wheel axle assembly and the chassis member locates the wheel axle assembly longitudinally of the vehicle. The novel support means further includes means to limit the movement of the leaf spring assembly transversely of the vehicle but permitting the support pad transverse surfaces to engage the outermost ends of one of the leaves of the leaf springs assembly during loading on the wheel axle assembly about the transverse and longitudinal axes, such that the arcuate surfaces thereby reduce the effective loading moment force about the longitudinal axis.

Still another object of this invention is to provide support pads having a transverse portion shaped so that arcuate surfaces are interconnected by a lateral surface. The leaf spring assembly attached to the wheel axle assembly has at the outermost ends of one of the leaves, a lateral surface in engagement with the support pads such that the arcuate surfaces of the support pads engage the outermost lateral surface to thereby substantially reduce the effective loading force on the leaf spring assembly during any loadings on the wheel axle assembly about the longitudinal axis spring assembly. Further, any loadings on the wheel axle assembly about the transverse axis of the vehicle, the lateral surface of the support pad is substantially engaged by the outermost lateral surface of one of the leaf springs to provide the location of the loading force thereon.

Other objects and features of the present invention will be apparent upon a perusal of the following specification and drawings of which:

FIGURE 1 is a side elevational view of an off-the-road truck vehicle employing the novel support pad suspension means on the front and rear wheel axles;

FIGURE 2 is a partial sectional view of the front wheel axle on section line 2—2 of FIGURE 1 illustrating a loading position of the wheel axle about the longitudinal axis;

FIGURE 3 is an exploded view of the engagement of the outermost end of one of the leaf springs of the leaf spring assembly with the support pads associated with the front wheel axle;

FIGURE 4 is an exploded view of the engagement of the outermost end of one of the leaves with the support pads shown in FIGURE 3 but with the leaf spring assembly rotated about a longitudinal axis;

FIGURE 5 is a partial sectional view of the rear wheel axle on section line 5—5 of FIGURE 1 illustrating a loading position of the rear wheel axle about the longitudinal axis;

FIGURE 6 is a partial sectional view along section line 6—6 of FIGURE 1 illustrating the constructional details of the rearwardmost support pads;

FIGURE 7 is an exploded view of the engagement of the outermost end of one of the rear leaves of the leaf spring assembly with one of the support pads associated with the rear wheel axle;

FIGURE 8 is an exploded view of a conventionally shaped support pad illustrating a loading engagement position of the leaf spring about the longitudinal axis; and FIGURE 9 is an exploded view of a conventionally shaped support pad in engagement with a leaf spring during loading about a transverse axis.

The present embodiment is the preferred embodiment, but it is to be understood that changes can be made in the present embodiment by one skilled in the art without departing from the spirit or scope of the present invention.

For a general description of the present invention reference is made to the drawings.

A truck vehicle of the off-the-road type comprising an operator's cab located at the forward end of its supporting chassis frame and a dump body located on the remaining portion of the chassis frame which is suspended and supported relative to the ground level by a connected forward and rearward wheel axle assembly. A plurality of leaf spring assemblies comprising one or more leaf springs are connected to the wheel axle assemblies and are engaging at their outermost ends support pads secured beneath the chassis frame member and forming part of a support means. The support means function to permit sliding longitudinal engagement of the leaf spring wheel axle assembly but to limit transverse movement of the wheel axle assembly relative to the chassis frame member. In addition to the leaf spring assembly, the wheel axle assemblies are further connected to the chassis frame member by locating means and a shock absorber. These further two connections of the wheel axle assembly to the chassis frame permit the wheel axle assemblies to move about a longitudinal axis and a transverse axis of the truck vehicle during any loadings thereon. The support pads comprise a transverse portion shaped to include arcuate surfaces interconnected by a lateral surface. The transverse portion engages the outer lateral surface at the outermost ends of one of the leaves of the leaf spring assembly. The arcuate shaped surfaces engage the outermost lateral surface during loadings on the wheel axle about the longitudinal axis of the vehicle thereby substantially reducing the effective loading force on the leaf spring assembly. The purpose of the transverse lateral surface is to substantially engage the leaf spring outermost lateral surface during loadings on the wheel axle about the transverse axis of the vehicle. In the absence of the support pad having the shaped transverse portion as aforedescribed, the effective loading force on the transverse portion is substantially increased when loadings on the wheel axle assembly occur about the longitudinal axis of the vehicle. Although the subject invention has illustrated a novel support pad for use on an off-the-road vehicle, it is to be understood that the support pad has application wherever a wheel axle leaf spring suspension, or the equivalent, is employed.

For a detailed description of the present invention, continued reference is made to the drawings.

A truck vehicle of the off-the-road type is generally indicated in FIGURE 1 by the reference number 10 and comprises a chassis frame member 11 supporting at the forward end thereof an operator's compartment 12 and a dump body 13 of conventional construction on the remaining portion. It is sufficient to note here that the dump body can be readily moved to a dumping position by extension of the hydraulic ram 14 pivotally connected at its ends 15 and 16, respectively, to the dump body 13 and a downward extending portion 17 secured to the chassis frame member 11.

A forward wheel axle assembly 18 is positioned below the chassis member 11 between the rearward portion of the operator's compartment 12 and the forward portion of the dump body 13. A support means securely attached to the chassis frame member 11 for the outermost ends of a leaf spring assembly comprises spaced-apart outer angle members 20 and 21. The details of the angle plate member 20 are best shown in cross-section in FIGURE 2 and further includes an inside angle plate member 20a such that the two members 20 and 20a are interconnected by a plate member 22 that securely supports the support pad 23. The other angle plate member 21 includes a similar inside angle plate member, not shown, so that the other plate 22 is attached in a similar manner so as to provide support for the other corresponding support pad 23.

The wheel axle assembly for the front wheels, best shown in FIGURE 2, comprises an axle housing 24 of conventional construction having attached thereto two transversely spaced-apart leaf spring assemblies 25 and 26 in a conventional manner through a plurality of fastener bolts 27 and assembly plate 27a as shown in FIGURES 1 and 2. The leaf spring assembly 26 comprises a series of assembled leaves 26a through 26i assembled into a leaf spring assembly 26 such that the outermost ends of the leaf 26a extend to engage and contact the support pads 23. In FIGURE 2 only the left half portion is shown of the wheel axle assembly 24 and further includes at the outer end a portion of the left front wheel 28 pivotally connected to the axle housing 24 through the pivotal connection 30 that forms part of the steering means, not shown. As shown in FIGURE 2 any loadings on the wheel axle assembly 18 about a longitudinal axis of the vehicle chassis member 11 can cause rotatable movement.

The front wheel axle assembly 18 is additionally suspended to the chassis frame 11 by locating rods 31 and 32 such that the upper parallel locating rod 31 is pivotally connected at one end 34 to the center of the axle housing 24 and pivotally connected to the transverse center of the chassis frame member 11 at its other end through the pivotal connection 33. The other locating rod 32 is pivotally connected at one end to the axle housing through the pivotal connection 36 and at the other end to the angle plate member 21 through the pivotal connection 35. To provide the pivotal connection 35 the angle member 21 is additionally reinforced through a channel member 22a, as shown in FIGURE 1. The remaining suspension of the wheel axle assembly 18 is provided by a shock absorber 39 pivotally connected at its ends in the conventional manner to the axle housing 24 and the chassis frame member 11. In addition to movement of the wheel axle assembly 18 as aforementioned about a longitudinal axis, it also can move about a transverse axis of the chassis member 11 during loadings thereon. Although only the left portion of the front wheel axle assembly 18 has been described, it is to be understood that the right portion corresponds in detail. It is also to be pointed out that the locating rod 31 is located in the center of the axle housing 24 and that there are two lower locating rods 32 connected to the outer ends of the axle housing 24 with only one locating rod 32 shown in FIGURE 1.

The rear wheel axle assembly 37 positioned toward the rearward end of the dump body 13 and at the rearward end of the chassis frame member 11 is resiliently suspended by a leaf spring assembly to the chassis frame member 11 through a suspension means. The rearward suspension means comprises an outer plate member 45 and an inner plate member 45a attached to the chassis member 11 best shown in FIGURE 6. Transverse angle members 46 and 47 are securely attached to the plate members 45 and 45a. Then the members 45 and 45a are secured to the chassis member 11 through plate members 49 to provide support for the upper support pad 44 and the lower support pad 43 respectively.

The forward suspension means of the rear axle assembly 37 is of similar construction to the rearward suspension means in FIGURE 6 and for the purpose of simplicity the following description is believed to be sufficient. The downwardly extending portion 17 includes the plate member 38 having the rearwardly extending portion 41 extending beyond a removable mudguard 40. The plate member 38 including portion 41 is secured to the chassis member 11 by a plate member 42 equivalent to the upper plate member 49 for the rearward suspension means. An inner plate member not shown but equivalent to the inner plate member 45a of the rearward suspension means is transversely positioned by a transverse angle member to provide securement of the lower support pad 43. The upper support pad 44 is secured to the underneath surface of the plate member 42.

As shown in FIGURE 5, the rear wheel axle assembly 37 comprises a rear axle housing 48 connecting at its outer end the rear wheel 50. The axle housing 48 has attached thereto a leaf spring assembly comprising vertically positioned upper and lower leaf spring assemblies 51 and 52 assembled through the conventional plurality of fastener bolts 54 and assembly plate 53. As foredescribed in connection with the front axle leaf spring assembly, the rear leaf spring assemblies comprise a plurality of assembled leaves such that the outermost ends of the uppermost leaves 51a and 52a for each rear leaf spring 51 and 52 engage and contact the upper and lower support pads 44 and 43 respectively. It is now pointed out here that the purpose of the lower spring 52 is for travel of the truck vehicle 10 in the absence of a load in the dump body 13; and the purpose of the upper spring 51 is for loading thereof.

In addition to the support pad suspension means of the rear axle assembly 37, additional suspension means are also provided. Locating rods 55 and 56 are pivotally connected at one end through pivotal connections 58 and 61 to the axle housing 48 and at the other end to the chassis frame member 11 through pivotal connections 57 and 60. The pivotal connection 60 is located on member 17 that forms part of an extension of the chassis member 11. The purpose of the locating rods 55 and 56 is to permit movement of the rear axle assembly 37 during loadings thereon about a longitudinal axis of the truck vehicle chassis member 17. The other purpose of the locating rods 55 and 56 during loadings on the wheel axle assembly 37 is to permit movement about a transverse axis of the vehicle chassis member 11. The final suspension means of the rear axle assembly 37 comprises a shock absorber 63 of conventional construction pivotally connected at its ends to the chassis frame member 11 and the axle housing 48 in a conventional manner. Although in FIGURES 1 and 5 only the left portion of the rear axle assembly 37 has been described, it is to be understood that the right portion of the rear axle assembly 37 is symmetrical in detail. It is to be further pointed out that the rear locating rods 55 and 56 correspond to the front locating rods 31 and 32 as aforedescribed.

Turning now to details of the support pads and referring to FIGURES 3 and 4, the front support pads 23 comprise an upper lateral surface 64 attached to the member 22 and an outer transversely shaped portion including arcuate shaped surfaces 67 and 68 interconnected by a flat extending lateral surface 66. As can readily be seen in the drawings, the support pad 23 comprises two pads corresponding in detail such that only one need be described unless otherwise specified and further includes a hollow portion indicated by the invisible line 65 for reducing the weight of the support pad 23. The upper leaves 25a and 26a of the leaf springs provide an upper flat extending lateral surface 70 that contacts and engages the transverse surfaces of the support pad 23. When a load on the front wheel axle assembly 28 occurs about a transverse axis the upper surface 70 of the leaves 25a and 26a substantially engage and contact only the flat extending lateral surface 66 of the support pad 23, the extent of contact being shown by the dimension line L. However, as shown in FIGURE 4, if the loading on the front wheel axle assembly 18 occurs about a longitudinal axis of the vehicle chassis member 11, the leaves 25a and 26a securely attached to the axle housing rotate therewith such that the point of contact and engagement between the support pad 23 and leaves 25a and 26a is shifted to the arcuate surface 67. Instead of the loading force extending across the engaged lateral surfaces 66 and 70 as indicated by the dimension line L in FIGURE 3, the area of contact or engagement between support pad 23 and leaf spring leaves 25a and 26a occurs at a point of contact or tangency between arcuate shaped surface 67 and lateral surface 70 such that the effective loading force or moment passes through the point of tangency as indicated by the arrow indicating the direction of the force and the dimension line L' extending from the center of leaf 25a or 26a as shown in FIGURE 4. If a load occurs about a longitudinal axis in the other direction, not shown in FIGURE 4, the other arcuate shaped surface 68 will engage the lateral surface 70 at the point of contact or tangency.

In FIGURES 8 and 9 the conventional shaped support pad in engagement with the upper leaves lateral surface is shown. As can readily be seen in FIGURE 9, the conventional shape of the transverse portion of the support pad 77 comprises substantially a flat extending lateral surface 78 engaging substantially the upper lateral surface 80 of the leaf. As can readily be seen in FIGURE 9 when a load occurs about a transverse axis of the vehicle the force contacting area extends as indicated by the dimension line L at a substantially greater length than the dimension line L of contact in FIGURE 3. However, if a load upon the wheel axle assembly occurs about the longitudinal axis the leaves rotate with the axle housing 24 or 48 shown in FIGURES 2 and 5 so that the point of contact and engagement between surfaces 78 and 80 has shifted to the extreme left end as shown in FIGURE 8. Since no arcuate shaped surface has been specifically provided in the conventional construction such as surface 67 in FIGURES 3 and 4, the effective loading force has extended a considerable distance to the left of center of the leaf such that the dimension line L' in FIGURE 8 is much greater than the dimension line L' in FIGURE 4. Thus it is readily apparent to those skilled in the art that the conventional support pad construction shown in FIGURES 8 and 9 provides a greater effective loading force moment than the arcuate shaped surface 67 for the support pad 23 shown by applicant. Further, the conventional shaped support pad 77 will result in a greater torsional stress on the leaves of the leaf spring assembly.

In FIGURE 7 is shown the transverse shape of the lower support pad 43, but it is to be understood that the upper support pad 44 corresponds in construction. The support pad 43 comprises a lateral surface 71 attached to the angle member 47 and a transverse shaped surface including arcuate shaped surfaces 74 and 75 interconnected by a flat extending lateral surface 73. FIGURE 7 shows the leaf 52a having its lateral surface 76 in engagement at the point of tangency with the arcuate surface 74 indicating that a load has occurred upon the rear axle assembly 37 about a longitudinal axis of the chassis member 11 thereby causing the effective loading force moment to pass through the point of tangency contact between surfaces 74 and 76 as indicated by the dimension line L and arrow indicating the direction of force acting on the support pad surface 74. Although not shown it should be readily understood that if a load occurs about a longitudinal axis in the other direction the other arcuate shaped surface 75 will engage the lateral surface 76 at the point of tangency. Similarly, when the load occurs about a transverse axis of the chassis member 11 the effective loading force occurs through the substantial contact between the flat extending surface 73 and the lateral surface 76.

In view of the foregoing detailed description, the operation of the support pads 22 on the front axle assembly 18 and the support pads 43 and 44 on the rear axle assembly 37 should be readily apparent to those skilled in the art. Thus, as the truck vehicle 10 is operated over the ground surface the transversely shaped surfaces of the support pads 23, 43 and 44 through the arcuate shaped portions 67, 68, 74 and 75 cooperate to reduce the effective loading force moment about a longitudinal axis of the chassis member 11 to thereby reduce the torsional stress on the leaf spring assemblies. When a load occurs about a transverse axis of the chassis member 11 during the operation of the truck vehicle 10, the flat extending surfaces 66 and 73 of the support pads 23, 43, and 44 provide substantial engagement of the engaging leaf surfaces 70 and 76 of the leaf springs 25, 26 and 51, 52 to prevent a high contact stress on the leaf spring assemblies. Finally since the transverse spacing between the inner and outer plate members of each front and rear support means such as the plate members 20a and 20 in FIGURE 2 provides limited transverse movement of the assembled leaf springs between the plate members, such that a longitudinal axis and/or a transverse axis of rotation of the wheel axle assemblies 18 and 37 varies for each instantaneous particular loading on the assemblies 18 and 37.

Having described the invention, what is desired to be protected and claimed by Letters Patent is:

1. For a vehicle suspension means including a frame member, a wheel axle including leaf springs located longitudinally and suspended transversely of said member, said leaf springs including at least one leaf and being rigidly secured in a spaced apart manner to said axle, and support means fore and aft on said frame member supporting the outermost ends of said springs, said outermost spring ends providing an upper outer lateral surface, said support means resiliently supporting said wheel axle during any loadings thereon about a longitudinal axis and a transverse axis of said member; said support means including a support pad having an outer transverse portion thereon providing arcuate shaped surfaces interconnected by a flat extending lateral surface with said lateral surface comprising not more than half the outer transverse portion of said support pad, said upper outer lateral surface of said outermost spring ends to substantially engage said pad lateral surface during loadings on said wheel axle about said transverse axis, and said spring upper outer lateral surface to substantially engage at least one of said pad arcuate shaped surfaces during loadings on said wheel axle about said longitudinal axis to thereby reduce the effective loading force upon said springs.

2. A device as described in claim 1 wherein said arcuate shaped surfaces on said outer transverse portion of said support pad are tangentially interconnected by said flat extending lateral surface.

3. A suspension means for a vehicle comprising a frame member, a wheel axle assembly including leaf springs and a wheel axle located longitudinally and suspended transversely of said member, said leaf springs at least a pair thereof being rigidly secured in a spaced-apart manner to said axle, means on said frame member supporting the outermost ends of said secured springs longitudinally of said member, said support means to resiliently support said wheel axle assembly during any loadings thereon about a longitudinal axis and a transverse axis of said member, said support means further limiting transverse movement of said wheel axle assembly, locating means operatively associated with said frame member and said wheel axle assembly to locate said assembly longitudinally along said frame member, said outermost ends of said springs further providing an outer upper lateral surface, said support means including means having a transverse portion being formed to have arcuate shaped surfaces interconnected by a flat extending lateral surface with said lateral surface comprising not more than half the transverse portion, said outer upper lateral surface of said outermost spring ends to engage one of said arcuate shaped surfaces of said support means at a point of tangency to thereby reduce the effective loading stress on said spring outer upper lateral surface during loadings on said wheel axle assembly about said longitudinal axis, and said spring end outer upper lateral surface to substantially engage said transverse portion lateral surface of the support means during loadings on said wheel axle assembly about said transverse axis.

4. A suspension means for a vehicle comprising a frame member, a wheel axle assembly including leaf springs and a wheel axle located longitudinally and suspended transversely of said member, said leaf springs being rigidly secured in a spaced-apart manner to said axle, each of said secured springs including a pair of springs positioned transversely thereof, means on said frame member supporting the outermost ends of said pair of secured springs longitudinally of said member, said support means to resiliently support said wheel axle assembly during any loadings thereon about a longitudinal and a transverse axis of said member, locating means operatively associated with said frame member and said wheel axle assembly to locate said assembly longitudinally along said member, said outermost ends of said springs providing an upper outer lateral surface, said support means including means providing a transverse portion having arcuate shaped surfaces interconnected by a linear surface with said linear surface comprising not more than half the transverse portion, said upper outer lateral surface of said outermost spring ends engaging one of said arcuate shaped surfaces of said support means at a point of tangency to thereby reduce the effective moment of the loading force on said springs during resilient movement about said longitudinal axis in response to loadings on said wheel axle assembly, and said upper outer lateral surface of said outermost spring ends to substantially engage said transverse linear surface of said support means during loadings on said wheel axle assembly about said transverse axis.

5. A suspension means for a vehicle comprising a frame member, a wheel axle assembly including leaf springs and a wheel axle located longitudinally and suspended transversely of said member, said leaf springs being rigidly secured in a spaced-apart manner to said axle, each of said secured springs including a pair of springs, one of said secured springs positioned vertically above the other, means on said frame member supporting the outermost ends of said pair of secured springs longitudinally of said member, said support means to resiliently support said wheel axle assembly during any loadings thereon about a longitudinal and a transverse axis of said member, locating means operatively associated with said frame member and said wheel axle assembly to locate said assembly longitudinally along said member, said outermost ends of said springs providing an upper outer lateral surface, said support means including means providing a transverse portion having arcuate shaped surfaces interconnected by a linear surface with said linear surface comprising not more than half the transverse portion, said upper outer lateral surface of said outermost spring ends engaging one of said arcuate shaped surfaces of said support means at a point of tangency to thereby reduce the effective moment of the loading force on said springs during resilient movement about said longitudinal axis in response to loadings on said wheel axle assembly, and said upper outer lateral surface of said outermost spring ends to substantially engage said transverse linear surface of said support means during loadings on said wheel axle assembly about said transverse axis.

References Cited in the file of this patent
UNITED STATES PATENTS

| 2,714,003 | Focht | July 26, 1955 |
| 2,764,405 | Armington | Sept. 25, 1956 |
| 2,861,797 | Norris | Nov. 25, 1958 |
| 2,999,679 | Ulderup | Sept. 12, 1961 |